R. JUDSON & J. P. SCHENCK, Jr.

Assignor to N. SEELEY and G. I. STEVENS

TIN CANS.

No. 7,490.

Reissued Feb. 6, 1877.

Witnesses:

Geo. H. Graham.

James L. a Pelos.

Inventors

Roswell Judson

John P. Schenck Jr.

per C. H. Forbes

Attorney

UNITED STATES PATENT OFFICE.

ROSWELL JUDSON AND JOHN P. SCHENCK, JR., OF MATTEAWAN, NEW YORK, ASSIGNORS TO NATHAN SEELEY AND GEORGE I. STEVENS, OF NEW YORK CITY.

IMPROVEMENT IN TIN CANS.

Specification forming part of Letters Patent No. 96,440, dated November 2, 1869; reissue No. 7,490, dated February 6, 1877; application filed November 29, 1876.

*To all whom it may concern:*

Be it known that we, ROSWELL JUDSON and JOHN P. SCHENCK, Jr., of Matteawan, in the county of Dutchess and State of New York, have invented a new and useful Improvement in Sheet-Metal Cans; and we do hereby declare that the following is a full, clear, and exact description of the same, reference being had to the accompanying drawing, forming a part of this specification, in which—

Figure 3:
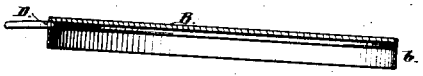
Figure 2:
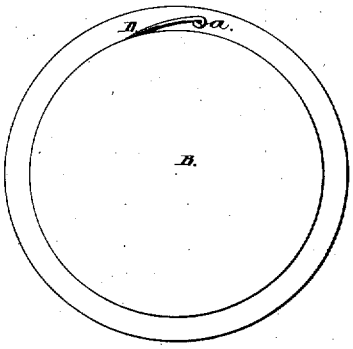
Figure 1:
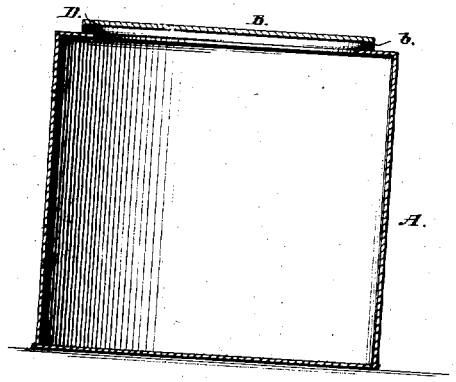

Figure 1 is a vertical section, Fig. 2 a plan view, and Fig. 3 an enlarged view, of the cover or cap detached.

Similar letters of reference indicate corresponding parts in the several figures.

Heretofore, in this class of devices, a wire with a projecting end has been arranged in a space between the inwardly-turned edge of the body of the can and the correspondingly-turned edge of an inclosed head, the respective parts being secured by filling the space above the wire with solder, which is displaced by the wire in the act of separating the parts.

Our invention consists, broadly, in arranging and securing said wire upon the interior surface of the sheet metal forming a part of the vessel, and causing it to cut through said metal when operated, as hereinafter explained.

Our invention consists, specifically, in the particular construction and arrangement of the several parts hereinafter described.

To enable others to make and use our invention we will proceed to describe a can embodying it.

In the drawing, A represents a can, and B the cover or cap, constructed with a depending flange, *b*. D is the opening-wire, arranged to encircle the inner side of the depending flange *b* of the cover, and with its end protruding through the same, as shown in the enlarged view, Fig. 3. The cover or cap B overlaps, and is secured to the body of the can by solder applied externally at the end of the depending flange *b*, which hermetically seals the same, the wire being arranged between the cover or cap and the can-body.

To open the can, the free end *a* of the wire is grasped by a pair of pinchers; or a nail or similar device may be placed within the loop formed thereon, and by pulling upon the wire at a right angle the metal is cut with little effort, and without injuring the contents of the can.

Having thus fully described our invention, what we claim, and desire to secure by Letters Patent, is—

1. A cutting-wire arranged and secured upon the interior surface of the sheet metal forming a part of the vessel, and having its end protruding, for the purpose set forth.

2. A cover or cap, B, for sheet-metal vessels, constructed with a depending flange, *b*, inclosing a cutting-wire having a protruding end, substantially as set forth.

3. A sheet-metal can or vessel whose cover has a depending flange, which overlaps a portion of the body of said vessel, and provided with a cutting-wire, arranged between the cover and the body, with its end protruding therefrom, for the purpose specified.

ROSWELL JUDSON.
JOHN P. SCHENCK, JR.

Witnesses:
S. A. COLDWELL,
WILLIAM BROWN.